United States Patent
Thrush et al.

(10) Patent No.: US 7,204,136 B2
(45) Date of Patent: Apr. 17, 2007

(54) TIRE PRESSURE SENSOR HOUSING

(75) Inventors: Roger L. Thrush, Clemmons, NC (US); Eric Charles Laurer, Clemmons, NC (US); Steven C. Eaton, Bowling Green, KY (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/024,334

(22) Filed: Dec. 22, 2004

(65) Prior Publication Data

US 2006/0130571 A1 Jun. 22, 2006

(51) Int. Cl.
*B60C 23/02* (2006.01)
*E01C 23/00* (2006.01)

(52) U.S. Cl. .................................................. 73/146.2

(58) Field of Classification Search ......... 73/146–146.8, 73/756
See application file for complete search history.

(56) References Cited

U.S. PATENT DOCUMENTS

| | | | |
|---|---|---|---|
| 5,717,135 A * | 2/1998 | Fiorletta et al. ........... | 73/146.5 |
| 5,939,977 A * | 8/1999 | Monson ....................... | 340/442 |
| 6,212,946 B1 * | 4/2001 | Naegele et al. ............ | 73/118.2 |
| 6,662,665 B1 * | 12/2003 | Huang ......................... | 73/756 |
| 6,805,000 B1 * | 10/2004 | Sheikh-Bahaie ........... | 73/146.8 |
| 6,899,153 B1 * | 5/2005 | Pollack et al. ............. | 152/152.1 |
| 6,904,796 B2 * | 6/2005 | Pacsai et al. ............... | 73/146.8 |
| 6,995,731 B2 * | 2/2006 | Lin .............................. | 343/895 |
| 2004/0055371 A1 * | 3/2004 | Sanchez et al. ............. | 73/146 |
| 2004/0261510 A1 * | 12/2004 | Schulze ...................... | 73/146 |
| 2005/0190114 A1 * | 9/2005 | Lin .............................. | 343/788 |
| 2005/0219139 A1 * | 10/2005 | Kimura et al. .............. | 343/788 |
| 2005/0270249 A1 * | 12/2005 | Saegusa et al. ............. | 343/788 |

* cited by examiner

*Primary Examiner*—Max Noori

(57) ABSTRACT

A sensor housing assembly for mounting a tire pressure sensor module within the pressurized cavity of a wheel and tire assembly includes a central housing that includes a housing bottom and defines a cavity therein. A bobbin cover is coupled to the central housing. The bobbin cover and the central housing are mountable to a mounting surface on the wheel. The bobbin cover and the central housing bottom include curved mounting surfaces that are complementary to a curvature of the mounting surface on the wheel. At least one bobbin assembly is received in the bobbin cover. The bobbin assembly is substantially straight and coupled to the central housing at a downward angle toward the wheel.

24 Claims, 7 Drawing Sheets

TIRE PRESSURE SENSOR HOUSING

BACKGROUND OF THE INVENTION

The invention relates generally to motor vehicle tire pressure monitoring, and more particularly, to a housing assembly for a tire pressure sensor suitable for use in the direct monitoring of air pressure in tires.

Maintaining proper air pressure in tires is an important consideration for a motor vehicle operator. Both over-inflation and under-inflation of the vehicle's tires can have detrimental effects on vehicle handling, making the vehicle harder to control. Low tire pressure also causes the tire to run hotter thereby degrading the tire side wall and shortening the life of the tire. In addition, low tire pressure reduces fuel economy of the vehicle. With growing concerns over safety issues, vehicles today are being equipped with tire pressure monitoring systems that have been developed to alert the vehicle operator when the pressure in one or more of the vehicles tires is outside a recommended range.

Two general approaches have been favored for tire pressure-monitoring. One is an indirect method that involves the determination of the rolling radius of each wheel and tire assembly. The other is a direct method that employs a wireless transmission of a signal from a transducer module installed inside each tire.

The indirect or rolling radius method relies on signals generated by wheel rotation sensors, typically installed as part of an anti-lock braking system. The rolling radius represents the radius from the center of the tire to the generally flattened area referred to as the contact patch that engages the road surface. The rotational speed of each wheel can be accurately measured and the rolling radius of the wheel and tire assembly can be determined. This system of tire pressure monitoring (frequently referred to in the art as ABS-tire pressure monitoring) does not, however, provide absolute values of tire pressure. Rather, an inference of the tire pressure must be made based on the rolling radius.

Direct sensing systems monitor tire pressure directly from inside the tire. Wireless tire pressure sensors and radio frequency (RF) transmitters are mounted inside each tire. In each tire, the tire pressure sensed by the tire pressure sensor is transmitted by the transmitter to a receiver/controller located on the vehicle and is subsequently conveyed to the vehicle operator, usually in the form of a display. While the direct sensing systems have the potential to provide more accurate information, they also generally include batteries to power the sensors and transmitters. Battery life, the need to remove the tire for access to the batteries, and the need to rebalance the tires after battery replacement, together with the disposal of worn out batteries are the major shortcomings of direct sensing systems. The sensors and transmitters must also be able to withstand the harsh environment inside a vehicle tire that includes high temperatures, shock and vibration, and centrifugal forces from tire rotation.

A need exists for a protective mechanical package or housing to reliably and securely mount a direct tire pressure electronic sensing system in the harsh environment inside a vehicle tire.

BRIEF DESCRIPTION OF THE INVENTION

In one aspect, a sensor housing assembly for mounting a tire pressure sensor module within the pressurized cavity of a wheel and tire assembly is provided. The sensor housing assembly includes a central housing that includes a housing bottom and defines a cavity therein. A bobbin cover is coupled to the central housing. The bobbin cover and the central housing are mountable to a mounting surface on the wheel. The bobbin cover and the central housing bottom include curved mounting surfaces that are complementary to a curvature of the mounting surface on the wheel. At least one bobbin assembly is received in the bobbin cover. The bobbin assembly is substantially straight and coupled to the central housing at a downward angle toward the wheel.

Optionally, a housing cover is coupled to the central housing, and the at least one bobbin includes a first bobbin assembly and a second bobbin assembly sequentially wound from a continuous wire. The central housing holds contacts for terminating a coil of each bobbin assembly and the contacts have terminal ends extending through the central housing bottom and into the cavity. The central housing includes first and second opposite ends, wherein each end includes a slot extending horizontally across an interior surface thereof and vertically extending channels are formed on an exterior surface thereof. The slots receive ridges formed on a housing cover for sliding engagement therewith and the channels receive mounting flanges on the at least one bobbin.

In another aspect, a sensor housing assembly for mounting a tire pressure sensor module within the pressurized cavity of a wheel and tire assembly is provided that includes a central housing holding contacts, wherein each contact includes a terminal end that extends through a bottom of the central housing into a cavity therein. The cavity receives the sensor module, and the sensor module is electrically connected to the terminal ends when the sensor module is received in the cavity. At least one bobbin assembly is coupled to the central housing. The at least one bobbin assembly includes a coil wound around a bobbin core. The coil is electrically connected to the sensor module through the contacts. A bobbin cover is coupled to the bobbin assembly, and the at least one bobbin assembly is received in the bobbin cover. The bobbin cover and the central housing bottom include curved mounting surfaces that are complementary to a curvature of a mounting surface on the wheel.

In another aspect, a method for continuously winding electrical coils around a plurality of bobbin cores, wherein each bobbin core includes an elongated post longitudinally extending between opposite first and second ends and the coil is wound so that both coil terminations are disposed at the first end of the bobbin core. The method includes winding a first coil around a post of a first bobbin core, winding a second coil around a post of a second bobbin core, the first and second coils including one continuous wire, and cutting the continuous wire between the first and second coils.

DETAILED DESCRIPTION OF THE INVENTION

Figure 1:
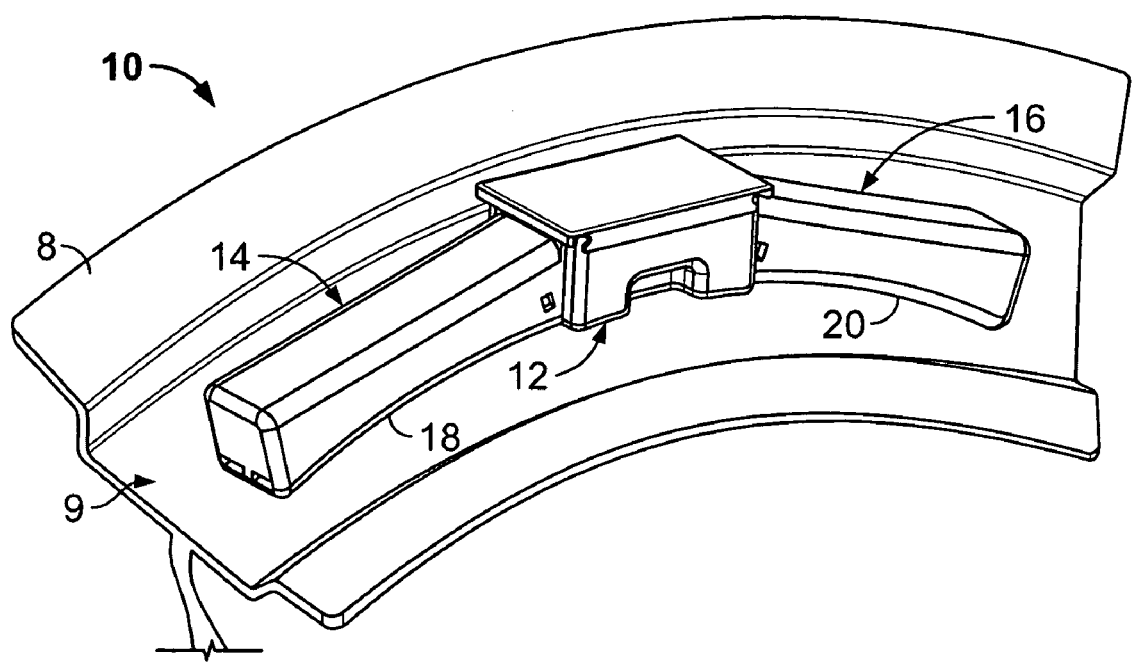
FIG. 1 is a perspective view of a sensor housing assembly formed in accordance with an exemplary embodiment of the present invention.

FIG. 1 illustrates a sensor housing assembly 10 formed in accordance with an exemplary embodiment of the present invention. The housing assembly 10 includes a central housing 12, a first bobbin cover 14, and a second bobbin cover 16. In an exemplary embodiment, the housing assembly 10 is configured to house an electronic module such as a sensor module (see FIG. 2) for a tire pressure monitoring system (TPMS). The housing assembly 10 is configured for attachment to the web area of a wheel 8, a portion of which is shown in FIG. 1. When a tire (not shown) is mounted on the wheel 8 and inflated, a pressurized cavity 9 is created within which the sensor housing assembly 10 is mounted. The first and second bobbin covers 14 and 16, respectively, each include curved lower surfaces 18 and 20, respectively, that have a curvature that is complementary to a curvature of a mounting surface on the wheel 8 to which the housing assembly 10 is attached.

Figure 2:
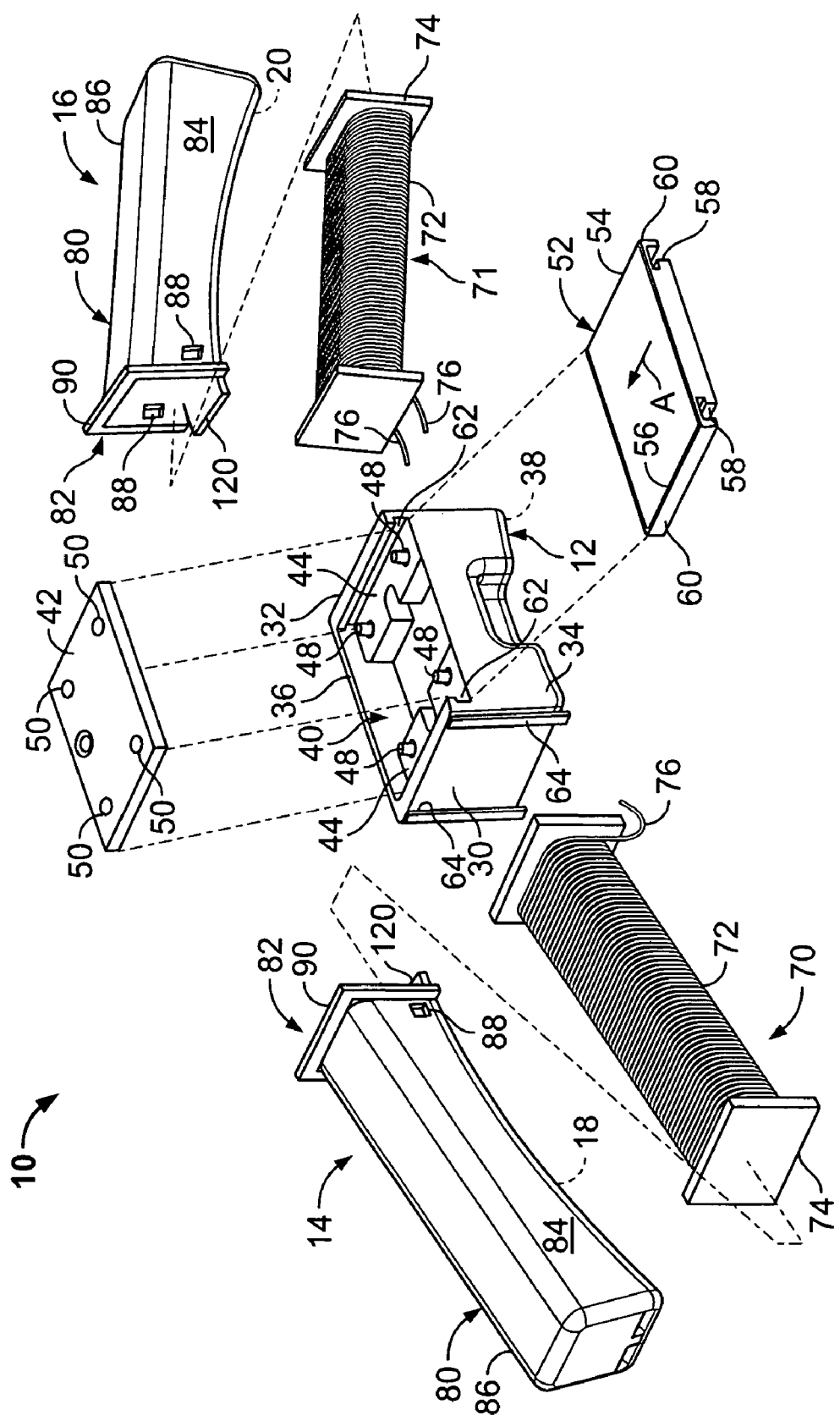
FIG. 2 is an exploded view of the housing assembly shown in FIG. 1.

FIG. 2 is an exploded view of the sensor housing assembly 10 shown in FIG. 1. The central housing 12 includes a first end 30 and an opposite second end 32, opposite first and second sides 34 and 36, and a bottom 38. The housing bottom 38 also has a curvature that is complementary to a curvature of the mounting surface on the wheel 8. The ends 30 and 32, sides 34 and 36 and bottom 38 define a cavity 40 that receives a sensor module 42. When received in the cavity 40, the sensor module 42 rests on platforms or surfaces 44 formed at opposite ends 30 and 32 of the housing 12. The sensor module 42 includes an antenna circuit (not shown) to enable the sensor module 42 to communicate with a monitoring system on a vehicle. The housing 12 holds electrical contacts 46A–16D (see FIG. 4) that extend through the bottom 38 of the housing 12 and into the cavity 40. Terminal ends 48 are electrically connected to the sensor module 42 at contact apertures 50 when the sensor module is mounted in the cavity 40. In an exemplary embodiment, the housing 12 holds four electrical contacts. In one embodiment, the terminal ends 48 are solder tails and the electrical connection to the sensor module 42 is a soldered connection. In other embodiments, other terminal types such as, but not limited to, eye of the needle, or press fit terminal contacts may also be used for making electrical connections to the sensor module 42.

The central housing 12 includes a cover 52 that closes the cavity 40 when the cover 52 is installed on the central housing 12. The cover 52 includes opposed first and second ends 54 and 56. Each end 54, 56 includes a ridge 58 that extends laterally across each end 54, 56 in the direction of the arrow A and a downwardly extending lip 60.

The central housing 12 also includes a slot 62 formed in the interior sides of each end 30 and 32 and channels 64 formed on the outer side of the ends 30 and 32. The slot 62 extends laterally across each end 30 and 32 from the first side 34 to the second side 36. Each slot 62 is open at the first side 34 and is closed at the second side 36. The channels 64 are open from the bottom side of the central housing 12.

Figure 4:
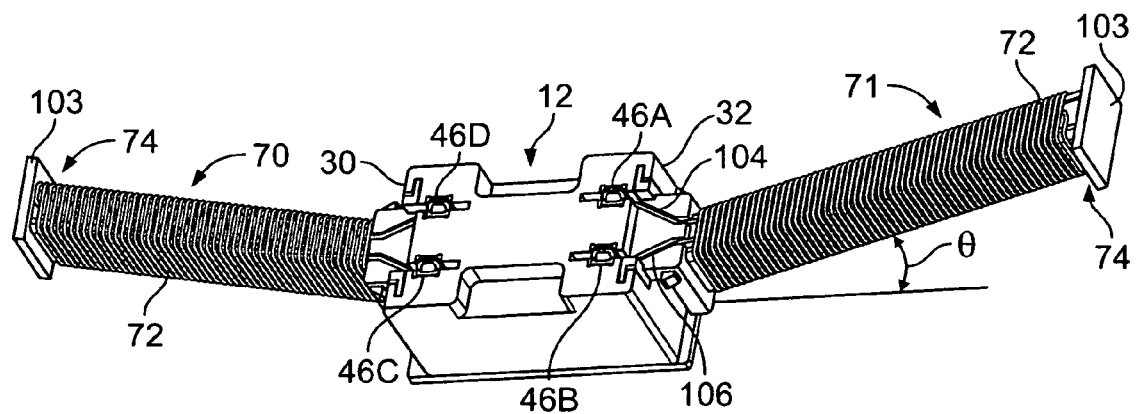
FIG. 4 is a bottom perspective view of a pair of bobbin assemblies joined to a central housing.

The sensor housing assembly 10 also includes a pair of bobbin assemblies 70 and 71. Each bobbin assembly 70, 71 includes a coil or winding 72 wound around a bobbin core 74. Each bobbin core 74 is coupled to one end 30, 32 of the central housing 12. Each coil 72 includes leads 76 that are terminated at the contacts 46 such that the coils 72 are electrically connected to the sensor module 42. The bobbin assemblies 70 and 71 are substantially straight and extend from the central housing 12 at a downward angle θ (see FIG. 4, note that FIG. 4 is a bottom view) from the central housing ends 30, 32.

Each bobbin assembly 70, 71 is enclosed in a bobbin cover 14, 16, respectively. The bobbin covers 14, 16 include curved bottom surfaces 18, 20, respectively, that substantially conform to the curvature of the wheel surface to which the sensor housing assembly 10 is mounted. The wheel mounting surface may be the drop center of the wheel, the wheel lands or a wheel rim surface. The bobbin covers 14, 16 are reconfigurable, by changing the radius of curvature of the curved lower surface 18, or interchangeable to conform to different sized wheels. The bobbin assemblies 70 and 71 are straight and do not have to conform to any wheel curvature. The bobbin covers 14, 16 are stressed members that retain the sensor housing assembly 10 to the associated wheel and house the wound cores 74 of the bobbin assemblies 70 and 71 in a protective manner, allowing the bobbin cores 74 and coil windings 72 to be centered by the bobbin flanges 107, and 108 (FIG. 3) relative to the bobbin cover which reduces the stress applied to the bobbin cores 74 and coil windings 72. In an exemplary embodiment, the sensor housing assembly 10 is adhesively mounted to the wheel primarily along the bobbin cover curved surfaces 18 and 20 and the central housing bottom 38, that have a large combined surface area in contact with the wheel mounting surface. A gap filling adhesive can be utilized to accommodate variation in wheel surface finish and the sensor housing assembly 10. The bobbin covers 14 and 16 each include an elongated body 80 having a first end 82 that is open to receive one of the bobbin assemblies 70, 71. The bobbin cover body 80 includes opposed sides 84 and 86 that each includes a latch receptacle 88 that engages a latch button 112 (see FIG. 3) on the bobbin core 74 for attachment of the bobbin cover 14, 16 to the bobbin assembly 70, 71. Each bobbin cover body 80 also includes an upwardly extending flange 90 and a protruding tab 120 at the first end 82. The tab 120 follows the curvature of the curved surfaces 18 and 20.

Figure 3:
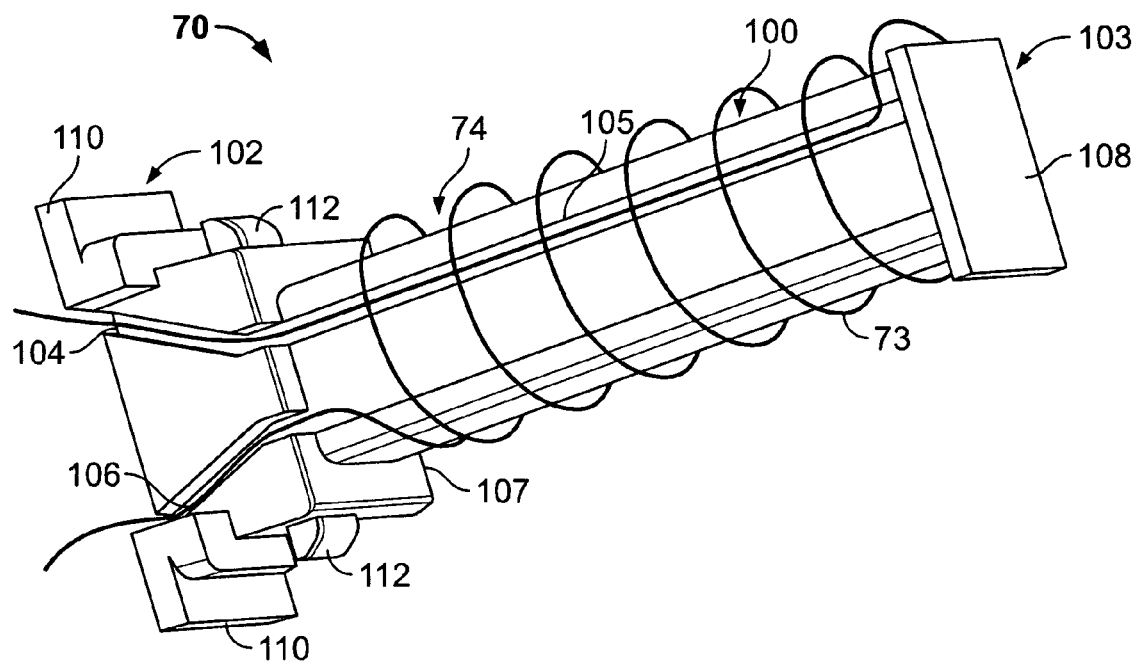
FIG. 3 is a perspective view of a bobbin assembly formed in accordance with an exemplary embodiment of the present invention.

FIG. 3 illustrates the bobbin assembly 70 in detail. The bobbin assembly 70 includes the bobbin core 74 that includes a first or mounting end 102 that is coupled to the central housing 12 (FIG. 2) and a free second end 103. An elongated bobbin post 100 longitudinally extends between a first flange 107 at the first end 102 and a second flange 108 at the second end 103. The bobbin post 100 includes lead wire slot 104 at the first end 102. The lead wire slot joins a wire channel 105 that extends along a length of the post 100 from the lead wire slot 104 at the first end 102 to the second end 103 where the wire channel 105 smoothly transitions from an axial path along bobbin post 100 to a path transverse to the bobbin post 100 and parallel to the flange 108 to facilitate wire dress and the winding process. A finish wire slot 106 forms a wire exit path at the first end 102. When installed in the bobbin covers 14 and 16 the first and second flanges 107 and 108, respectively, interact with the inside surfaces of the bobbin covers 14 and 16 to locate the bobbin assembly 70 to prevent significant contact between the coils 72 and the bobbin covers 14 and 16 thereby protecting the coils 72.

When the bobbin core 74 is wound, that is, when the coil 72 (FIG. 2) is formed on the bobbin core 74, the coil wire 73 is routed from the first end 102 through the lead wire slot 104 and wire channel 105 to the bobbin core second end 103. The coil wire 73 is then wound back a pre-determined number of turns to the first end 102 covering the lead wire channel 105 and out through the finish wire slot 106. The wound coil wire 73 forms the completed coil 72 shown in FIG. 2. The number of turns of the coil wire 73 can vary based on the particular application.

The bobbin core 74 includes mounting flanges 110 that are received in the channels 64 on the housing 12 (FIG. 2) when the bobbin assembly 70, 71 is mounted on the housing 12. Latch buttons 112 extend transversely from the first flange 107 and are provided to retain the bobbin covers 14, 16 (FIG. 2). The latch buttons 112 are received in the latch receptacles 88 on the bobbin cover 14, 16 to retain the bobbin cover 14, 16 with a snap fit.

FIG. 4 illustrates a bottom perspective view of the bobbin assemblies 70 and 71 joined to the central housing 12. The bobbins assemblies 70 and 71 are coupled to the ends 30 and 32, respectively, of the central housing 12. In the bottom view of FIG. 4, the central housing 12 and bobbin assemblies 70 and 71 are inverted such that the bobbin assemblies 70 and 71 are shown extending at an upward angle θ. However, it is to be understood that the bobbin assemblies 70, 71 extend from the central housing 12 at a downward angle θ toward the wheel 8 (FIG. 1) on which the sensor housing assembly 10 is to be mounted. The angled extension of the bobbin assemblies 70, 71 from the central housing 12 allows the bobbin assemblies 70, 71 to be fabricated in a straight configuration having straight coils 72 (FIG. 2) to facilitate the winding process. The downwardly angled extension facilitates the use of the bobbin assemblies 70, and 71 with the bobbin covers 14 and 16 having downwardly curved mounting surfaces 18, 20 that engage the wheel mounting surface. Additionally, the downwardly angled extension of the bobbin assemblies 70 and 71 from the central housing 12 facilitates the use of the bobbin assemblies 70, 71 with multiple wheel sizes since the bobbin assemblies 70, 71 do not have to conform to a wheel curvature. In an exemplary embodiment, the angle θ is approximately eighteen degrees. However, it is to be understood that the angle θ is application specific and is therefore subject to variation.

The coil windings 72 are independent from each other and are terminated in the contact terminals 46A, 46B, 46C, and 46D and are thereby electrically connected to the sensor module 42 (FIG. 2) when the sensor module 42 is installed in the central housing 12. When rotated in a magnetic field, the bobbin assemblies 70 and 71 generate power for the sensor module 42. In an exemplary embodiment the bobbin assemblies 70 and 71 are wound sequentially from a single continuous coil wire 73 (FIG. 3). Starting with the bobbin assembly 71, the coil wire 73 is first terminated at a first termination point after which the coil wire 73 is routed through the lead wire slot 104 and the wire channel 105 (FIG. 3) in the bobbin core 74. The coil wire 73 is then wound around the bobbin core 74 for a specified number of turns from the bobbin core second end 103 (FIG. 3) to the finish wire slot 106. From the finish wire slot 106, the coil wire 73 is routed to and terminated at a second termination point. With the coil wire 73 still intact, the coil wire 73 is routed to and terminated at a third termination point which is positioned adjacent the lead wire slot 104 in the bobbin core 74 of the bobbin assembly 70. The coil wire 73 is then routed through the lead wire slot 104 and the wire channel 105 (FIG. 3) of the bobbin core 74 of the bobbin assembly 70 and then wound a specified number of turns to the finish wire slot 106 and then routed to and terminated at a fourth and final termination point. The coil wire 73 is then cut between the second and third terminations to separate the coils 72 of the bobbin assemblies 70 and 71. After attachment of the bobbin assemblies 70 and 71 to the central housing 12, the terminal ends of the coil wire 73 are terminated to the contact terminals 46A, 46B, 46C, and 46D as shown in FIG. 4.

In an exemplary embodiment, the terminal contacts 46A–46D are double slotted insulation displacement contacts (IDC). Each of the contacts 46 provides a second insulation displacement point so that a redundancy in the coil wire terminations is provided. Additionally, the contacts 46A–46D are oriented so that centrifugal forces will tend to drive the coil wire 73 deeper into the contacts 46A–46D, thus improving reliability of the wiring terminations. An applicator tool is used for making the terminations in the IDC contacts 46A–46D.

Figure 5:
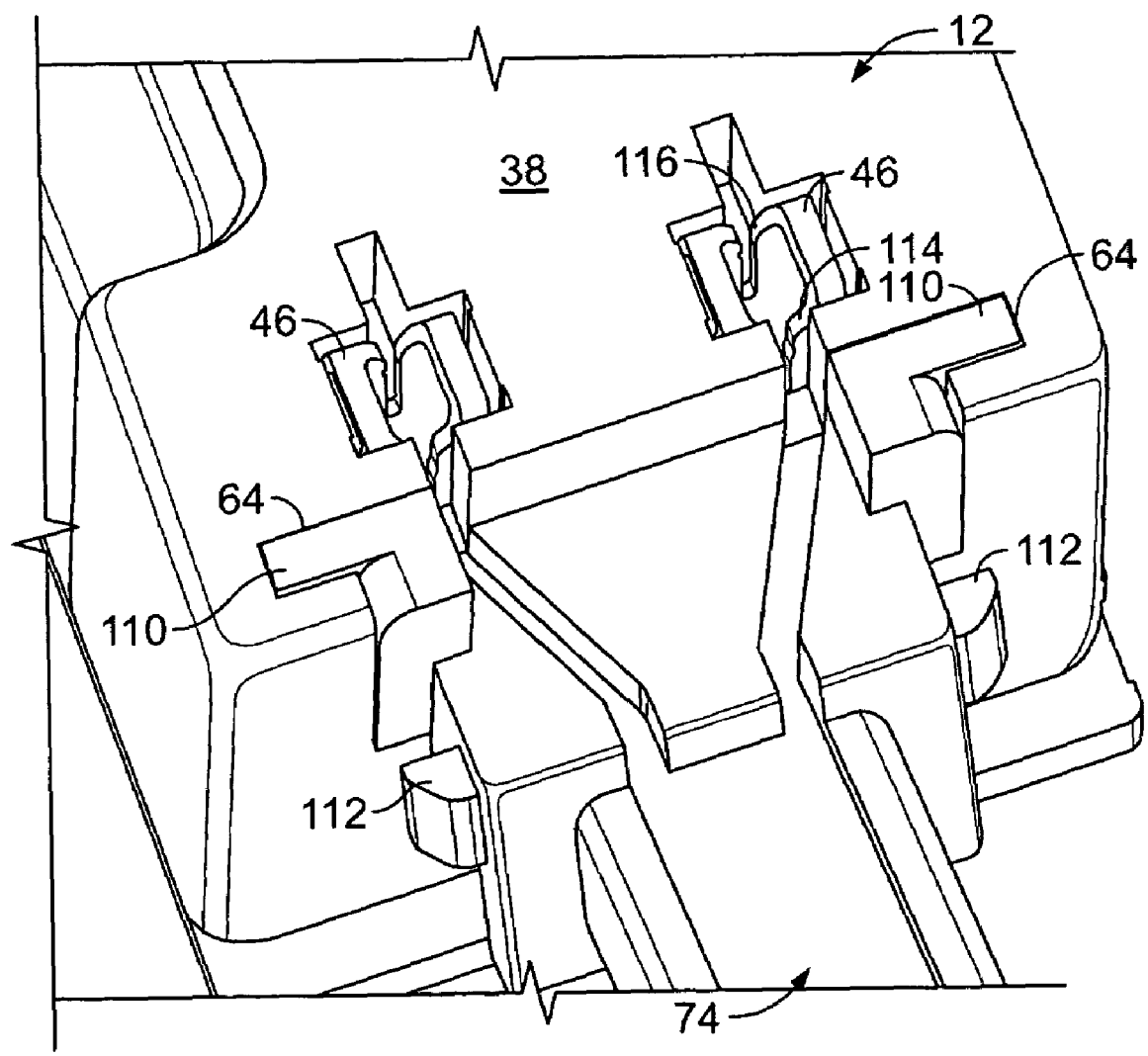
FIG. 5 is a perspective view illustrating the retention of a bobbin core to a central housing.

FIG. 5 illustrates the attachment of a bobbin assembly, such as the bobbin assembly 70, to the central housing 12 as viewed from the bottom side of the housing 12. As shown, the mounting flanges 110 on the bobbin core 74 are received in the channel 64 in the central housing 12. The bobbin core 74 is inserted from the bottom side of the central housing 12. With this orientation, when the sensor housing assembly 10 is mounted on the wheel 8 (FIG. 1), centrifugal forces will tend to drive the bobbin core 74 deeper into the channel 64. The contacts 46 are positioned in blind cavities in the bottom 38 of the central housing 12, each of which has a provision for terminal ends 48 to extend through the bottom 38 of central housing to the platform 44 to provide electrical connections between the coils 72 (FIG. 3) and the sensor module 42 (FIG. 2). Each contact 46 includes a first contact slot 114 and a second slot 116 to provide redundant connections between the coils 72 and sensor module 42. In the exemplary embodiment, the contact slots 114 and 116 are insulation displacing contact slots.

Figure 6:
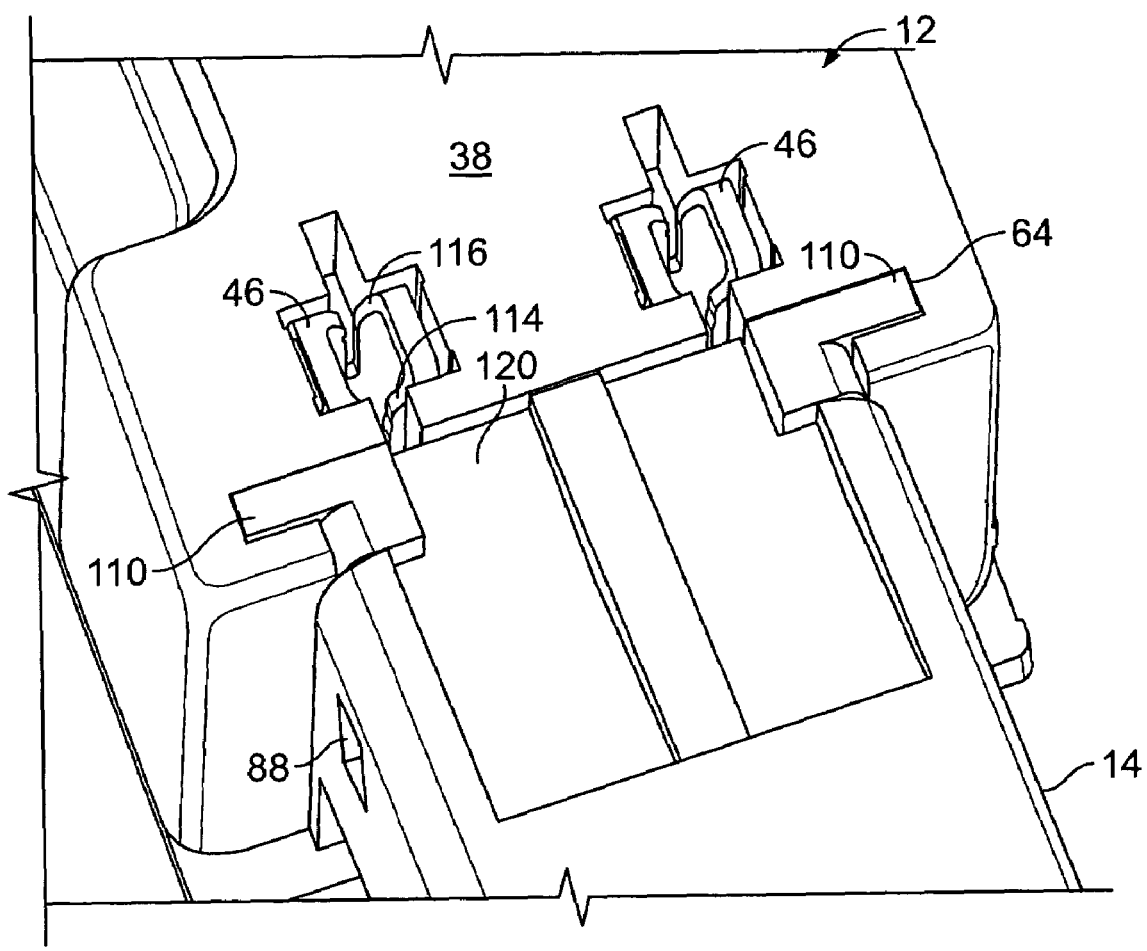
FIG. 6 is a perspective view illustrating the retention of a bobbin cover to a bobbin core.

FIG. 6 illustrates retention of the bobbin cover 14 to the bobbin assembly 70. The bobbin assembly 70 is received inside the bobbin cover 14. When fully inserted, the latch buttons 112 on the bobbin core 74 are received in the latch receptacles on the bobbin cover 14 with a snap fit. When attached to the bobbin core 74, the tab portion 120 on the bobbin cover 14 covers and protects a portion of the lead wire and finish wire areas adjacent the contact terminals 46.

With reference to FIG. 2, the central housing 12 also includes a retention system that holds the sensor housing assembly 10 together. The retention system includes a slot 62 formed in the interior sides of each end 30 and 32, channels 64 formed on the outer side of the ends 30 and 32, and the downwardly extending lips 60 on the housing cover 52. In assembling the sensor housing 10, the bobbin assemblies 70 and 71 are coupled to the central housing by sliding the mounting flanges 110 (FIG. 3) of the bobbin cores 74 upwardly into the channels 64 on the central housing 12. After the bobbin assemblies 70 and 71 are terminated to the central housing 12, the bobbin covers 14, 16 are placed over the bobbin assemblies 70, 71 and moved toward the central housing 12 until the bobbin cover 14, 16 snaps over the latch buttons 112 (FIG. 3) on the bobbin core 74. Once the sensor module is installed and terminations to the terminal ends 48 are made, the housing cover 52 is installed by sliding the ridges 58 into the slots 62 in the ends 30 and 32 of the housing body. As the housing cover is installed, the lips 60 slide over the upwardly extending flange 90 on each bobbin cover 14, 16 to retain the bobbin cover 14, 16 to the central housing 12. The bobbin covers 14 and 16 are therefore coupled both to the bobbin cores 74 as well as the central housing 12. Thus, the central housing 12, the bobbin assemblies 70 and 71, the bobbin covers, 14 and 16 and the housing cover 52 are interlocked together.

In an exemplary embodiment, the housing assembly 10 is fabricated from an engineering resin such as polybutylene terephthalate (PBT). It is to be understood, however, that other known resins having similar properties may also be used. A sealant may be applied to the contact areas on the central housing 12, the wire lead slot 104 and the finish wire slots 106 to protect the electrical connections. In one embodiment, an epoxy sealant may be used. Alternatively, a urethane epoxy or a hot melt sealant can also be used.

Figure 7:
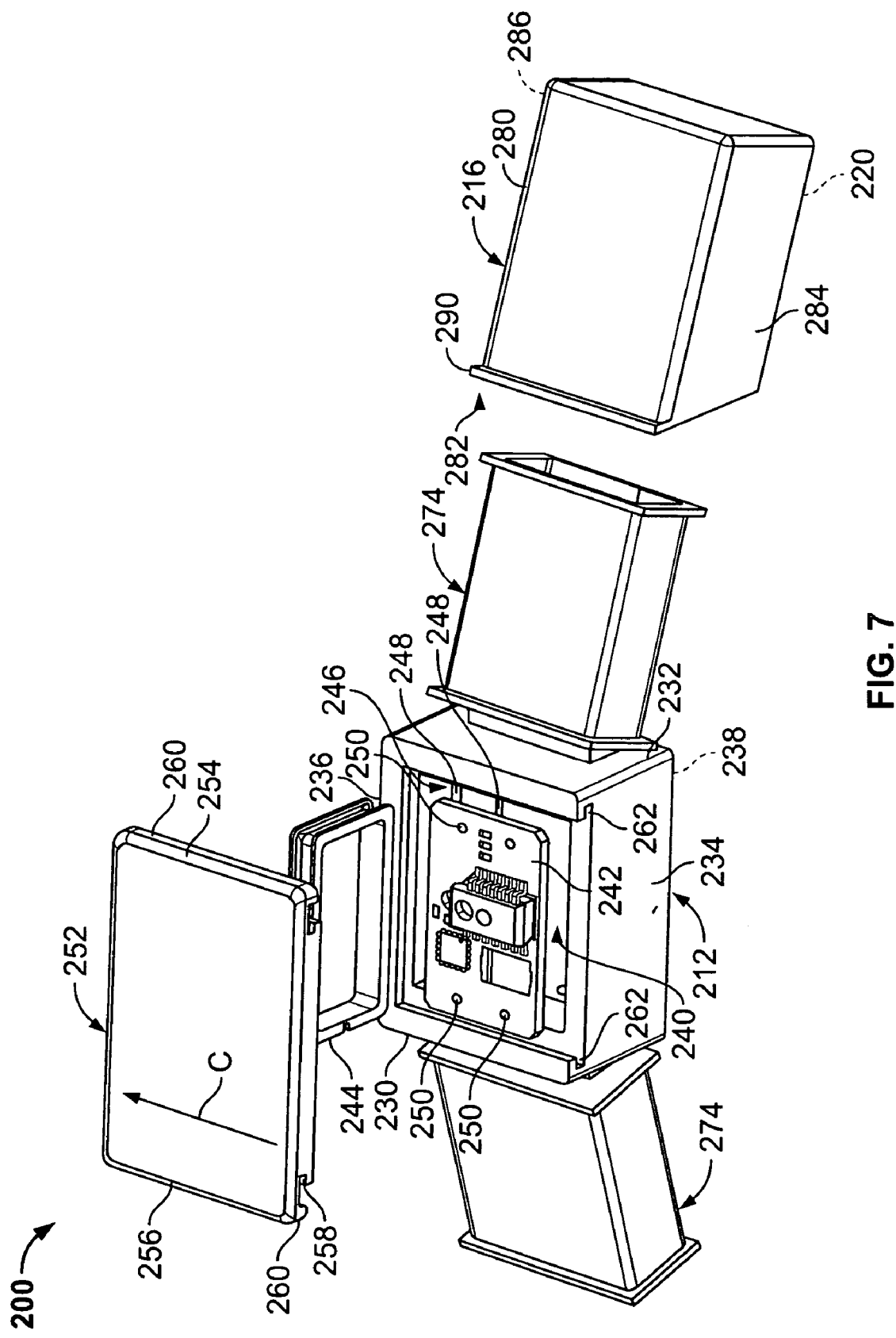
FIG. 7 is a perspective view of a sensor housing assembly according to an alternative embodiment of the present invention.

FIG. 7 illustrates a sensor housing assembly 200 formed in accordance with an alternative embodiment of the present invention. The housing assembly 200 includes a central housing 212, a first bobbin cover (not shown) and a second bobbin cover 216. As with the housing assembly 10 previously described, the housing assembly 200 is configured for attachment to the web area of a wheel, such as the wheel 8, shown in FIG. 1. Each bobbin cover 216 includes a curved lower surface 220 that has a curvature that is complementary to a curvature of a mounting surface on the wheel to which the housing assembly 200 is attached.

The central housing 212 includes a first end 230 and an opposite second end 232, opposite first and second sides 234 and 236, and a bottom 238. The housing bottom 238 also has a curvature that is complementary to a curvature of the mounting surface on the wheel. The ends 230 and 232, sides 234 and 236 and bottom 238 define a cavity 240 that receives a sensor module 242. The housing 212 holds electrical contacts (not shown) that extend through the bottom 238 of the housing 212 and into the cavity 240. Terminal ends 248 are electrically connected to the sensor module 242 at contact apertures 250 when the sensor module is mounted in the cavity 240. In an exemplary embodiment, the housing 212 holds four electrical contacts. In one embodiment, the terminal ends 248 are solder tails and the electrical connection to the sensor module 242 is a soldered connection. In other embodiments, other terminal types such as, but not limited to, eye of the needle, or press fit terminal contacts may also be used for making electrical connections to the sensor module 242.

A bobbin core 274 is connected to each end 230 and 232 of the central housing 212. As previously described with respect to the sensor housing assembly 10 (FIGS. 1 and 2), the bobbin cores 274 are received in a respective one of the bobbin covers 216 when the sensor housing assembly 200 is assembled. In comparison to the bobbin cores 74 (see FIG. 3) previously described, the bobbin cores 274 are shorter in length but larger in cross sectional area and are configured to provide power coils, when wound, that have fewer turns of coil wire (not shown). The attachment of the bobbin cores 274 to the central housing 212 is as described previously. The sensor housing assembly 200 also includes an antenna hoop 244 that is disposed within the central housing body 212. When the antenna hoop 244 is wound with a wire coil an internal transmit (TX) antenna is provided. The sensor module 242 is offset in the cavity 240 to provide space for the antenna hoop 244 which is positioned adjacent the second side 236 in a pocket 246 formed in the central housing 212. The antenna hoop 244 is oriented to stand on one longitudinal side so that when wound, the antenna coil cross section is perpendicular to the rotational axis of the wheel and also perpendicular to a cross section of the power coil windings. This orientation gives the antenna a distinct signature so that the antenna signal is readily identifiable.

The central housing 212 includes a cover 252 that closes the cavity 240 when the cover 252 is installed on the central housing 212. The cover 252 includes opposed first and second ends 254 and 256. Each end 254, 256 includes a ridge 258 that extends laterally across each end 254, 256 in the direction of the arrow C and a downwardly extending lip 260. The central housing 212 also includes a slot 262 formed in the interior sides of each end 230 and 232. The slot 262 extends laterally across each end 230 and 232 from the first side 234 to the second side 236. Each slot 262 is open at the first side 234 and is closed at the second side 236. The ridges 258 are slidably received in the slots 262 when the cover 252 is installed on the central housing 212.

Figure 8:
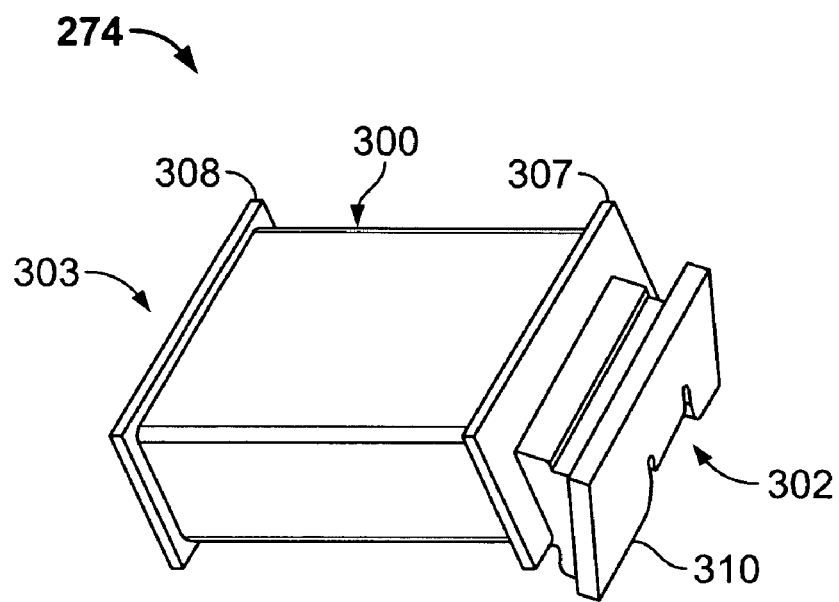
FIG. 8 is a top perspective view of a bobbin core formed in accordance with an alternative embodiment of the present invention.
Figure 9:
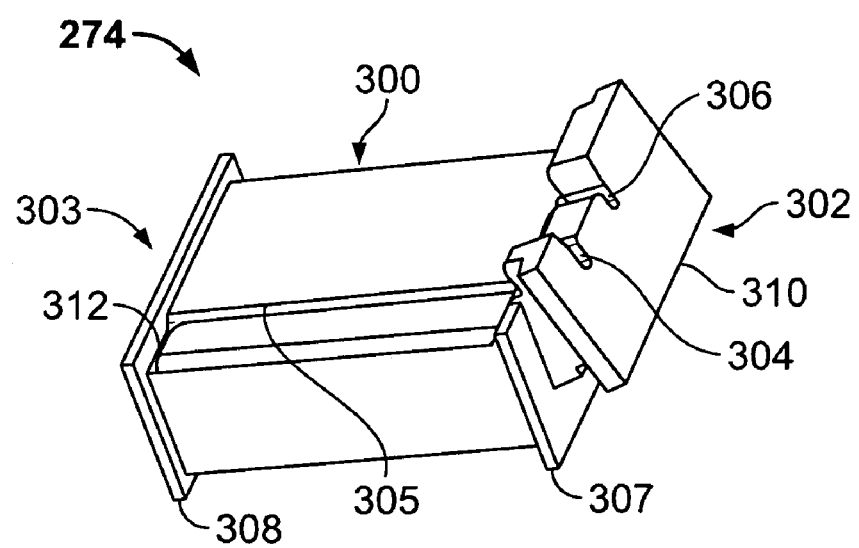
FIG. 9 is a bottom perspective view of the bobbin core shown in FIG. 8.

FIG. 8 is a top perspective view of the bobbin core 274. FIG. 9 is a bottom perspective view of the bobbin core 274. The bobbin core 274 includes a first or mounting end 302 that is coupled to the central housing 212 (FIG. 7) and a free second end 303. A bobbin post 300 extends between a first flange 307 at the first end 302 and a second flange 308 at the second end 303. A lead wire slot 304 at the first end 302 of the bobbin core 274 joins a wire channel 305 that extends along a length of the post 300. The wire channel 305 extends from the first end 302 to the second end 303 where the wire channel 305 smoothly transitions from an axial path along bobbin post 300 to a path 312 transverse to the bobbin post 300 and parallel to the flange 308 to facilitate wire dress and the winding process. A finish wire slot 306 forms a wire exit path at the first end 302. When installed in the bobbin covers 216 the first and second flanges 307 and 308, respectively, interact with the inside surfaces of the bobbin covers 216 to locate the bobbin core 274 to prevent significant contact between the coils (not shown) wound on the bobbin core 274 thereby protecting the coils. The bobbin core 274 includes mounting flanges 310 that are received in the channels (not shown) on the housing 212 (FIG. 7) when the bobbin core 274 is mounted on the housing 212.

Each bobbin core 274, after being wound with a coil wire to form a bobbin assembly (not shown), is received in one of the bobbin covers 216 (FIG. 7). The bobbin covers 216 include curved lower surfaces 220 that substantially conforms to the curvature of the wheel surface to which the sensor housing assembly 200 is mounted. The bobbin cover, 216 is reconfigurable, by changing the radius of curvature of the curved lower surface 220, or interchangeable to conform to different sized wheels. The bobbin cores 274 are straight and do not have to conform to any wheel curvature. The bobbin covers 216 are stressed members that retain the sensor housing assembly 200 to the associated wheel and house the wound cores 274 in a protective manner, allowing the bobbin cores 274 to be centered by the bobbin flanges 307, and 308 (FIG. 8) relative to the bobbin cover 216 (FIG. 7) which reduces the stress applied to the bobbin cores 274 and coil windings. The bobbin covers 216 each include an elongated body 280 having a first end 282 that is open to receive one of the bobbin cores 274 after being wound to form bobbin assemblies. The bobbin cover body 280 includes opposed sides 284 and 286. Each bobbin cover body 280 also includes an upwardly extending flange 290 at the first end 282. When the sensor housing module 200 is assembled, the lip 260 on the cover 252 extends over the flange 290 to retain the bobbin cover 216.

Figure 10:
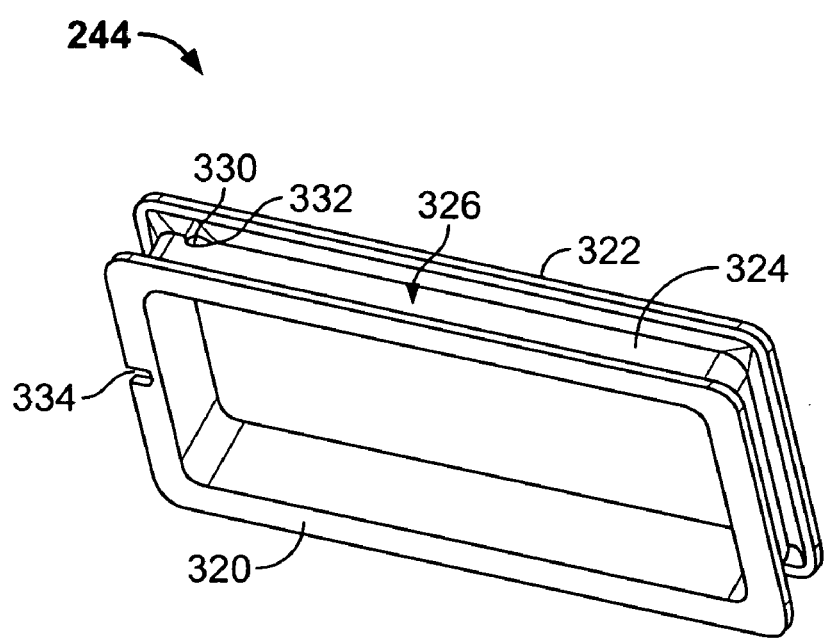
FIG. 10 is a perspective view of the antenna hoop shown in FIG. 7.

FIG. 10 is a perspective view of the antenna hoop 244 shown in FIG. 7. The antenna hoop 244 includes a first flange 320 and a second flange 322. The flanges 320 and 322 are separated by a web 324. The flanges 320 and 322 are substantially parallel to one another and extend outwardly from the web 324 to define a wire channel 326 that receives an antenna coil wire (not shown) that is wrapped around the antenna hoop to form a TX antenna. In an exemplary embodiment, the antenna hoop 244 is rectangular in shape. However, it is to be understood that other shapes are also contemplated.

The antenna hoop 244 includes a hole 330 that extends through the web 324 adjacent one of the flanges 320, 322. The hole 330 is provided to receive a free first end of the antenna coil wire, with the free end constituting a floating ground for the antenna. The hole 330 includes a start feature 332 that grips the coil wire. As shown in FIG. 10, the orientation of the start feature 332 is such that the antenna coil would be formed with clockwise turns in order for the start feature 332 to grip the coil wire. The antenna hoop 244 also includes a notch 334 on one of the flanges 320, 322 that forms a lead out slot for a second end (not shown) of the antenna coil wire. The second end of the antenna coil wire is connected the sensor module 242 and may include a crimped on terminal or other terminal contact. In an exemplary embodiment, the second end of the antenna coil wire is connected to a termination in the central housing 212 that automatically mates electrically with the sensor module 242 when the sensor module 242 is placed in the cavity 240.

The embodiments herein described provide a housing assembly for a sensor module that is suitable for use in monitoring tire pressure from within a vehicle tire. The housing assembly is configured to withstand the harsh environment inside a tire. The contacts are oriented so that centrifugal forces encountered during use tend to reinforce the connections by pushing the wire deeper into the IDC contacts. Similarly, the bobbin assemblies also mount to the central housing in an upward direction. In addition, the straight bobbin assemblies having a downward angle with respect to the central housing allows the housing assembly to accommodate a range of wheel sizes. This is further facilitated by using the bobbin covers as stressed members in mounting the housing assembly to the wheel.

While the invention has been described in terms of various specific embodiments, those skilled in the art will recognize that the invention can be practiced with modification within the spirit and scope of the claims.

What is claimed is:

1. A sensor housing assembly for mounting a tire pressure sensor module within the pressurized cavity of a wheel and tire assembly, said housing assembly comprising:
    a central housing including a rigid housing bottom having a curved mounting surface that is complementary to a curvature of a mounting surface on the wheel, said central housing mountable to the mounting surface of the wheel, said central housing defining a cavity configured to receive the sensor module;
    a bobbin cover separately provided from said central housing and being coupled to said central housing, said bobbin cover including a rigid body having a bottom with a curved mounting surface that is complementary to a curvature of the mounting surface on the wheel, said bobbin cover mountable to the mounting surface of the wheel; and
    a bobbin assembly received in said bobbin cover, said bobbin assembly being substantially straight and coupled to said central housing at a downward angle toward the wheel, said bobbin assembly configured to generate power and supply the generated power to the sensor module.

2. The sensor housing assembly of claim 1, wherein said bobbin cover is coupled to said central housing and said bobbin assembly.

3. The sensor housing assembly of claim 1, wherein said bobbin assembly comprises a first bobbin assembly and a second bobbin assembly sequentially wound from a continuous wire.

4. The sensor housing assembly of claim 1, wherein said central housing holds contacts for terminating a coil of said bobbin assembly, said contacts having terminal ends extending tbro ugh said central housing bottom and into said cavity.

5. The sensor housing assembly of claim 1, wherein said central housing holds contacts for terminating a coil of said bobbin assembly, said contacts comprising IDC contacts.

6. The sensor housing assembly of claim 1, further comprising a housing cover slidably coupled to said central housing.

7. The sensor housing assembly of claim 1, wherein said bobbin assembly includes a bobbin core having a latch button thereon and said bobbin cover includes a latch receptacle that receives said latch button to attach said bobbin cover to said bobbin core with a snap fit.

8. The sensor housing assembly of claim 1, wherein said central housing includes first and second opposite ends, each said end including a slot extending horizontally across an interior surface thereof and vertically extending channels formed on an exterior surface thereof, said slots receiving ridges formed on a housing cover for sliding engagement therewith and said channels receiving mounting flanges on said bobbin assembly.

9. The sensor housing assembly of claim 1, further comprising a housing cover slidably coupled to said central housing, said hausing cover including opposed first and second ends, each said end including a downwardly extending lip that engages a upwardly extending flange on said bobbin cover to retain said bobbin cover to said central housing.

10. The sensor housing assembly of claim 1, wherein the sensor housing assembly is sealed.

11. The sensor housing assembly of claim 1, wherein said bobbin cover includes a tab that covers a lead wire area of a bobbin core of said bobbin assembly.

12. A sensor housing assembly for mounting a tire pressure sensor module within the pressurized cavity of a wheel and tire assembly, said housing assembly comprising:
    a central housing holding contacts, each said contact comprising a terminal end that extends through a bottom of said central housing into a cavity therein, said cavity receiving the sensor module, the sensor module being electrically connected to said terminal ends when the sensor module is received in said cavity;
    a bobbin assembly coupled to said central housing, said bobbin assembly including a coil wound around a bobbin core, wherein the coil is configured to generate power, and said coil being electrically connected to and supplying power to the sensor module through said contacts; and
    a bobbin cover having a rigid body defining a cavity, said bobbin assembly received in said cavity, said bobbin cover and said central housing bottom including curved mounting surfaces having curvatures that are complementary to a curvature of a mourning surface on the wheel, said bobbin cover and said central housing configured to be mounted to the mounting surface on the wheel.

13. The sensor housing assembly of claim 12, wherein said contacts comprise insulation displacement contacts (IDC).

14. The sensor housing assembly of claim 12, wherein said contacts comprise double slotted IDC contacts providing redundant coil terminations.

15. A sensor housing assembly, for mounting a tire pressure sensor module within the pressurized cavity of a wheel and tire assembly, said housing assembly comprising:
 a central housing holding contacts, each said contact comprising a terminal end that extends through a bottom of said central housing into a cavity therein, said cavity receiving the sensor module, the sensor module being electrically connected to said terminal ends when the sensor module is received in said cavity:
 a bobbin assembly couoled to said central housing, said bobbin assembly including a coil wound around a bobbin core, and said coil being electrically connected to the sensor module through said contacts; and
 a bobbin cover coupled to said bobbin assembly, said bobbin assembly received in said bobbin cover, said bobbin cover and said central housing bottom including curved mounting surfaces that are complementary to a curvature of a mounting surface on the wheel;
 wherein said contacts comprise IDC contacts oriented such that centrifugal forces drive a terminating end of said coil deeper into said contacts.

16. The sensor housing assembly of claim 12, wherein said bobbin assembly comprises a first bobbin assembly and a second bobbin assembly and said bobbin coils are sequentially wound from a continuous wire.

17. The sensor housing assembly of claim 12, wherein said bobbin assembly is coupled to said central housing at a downward angle toward the wheel.

18. The sensor housing assembly of claim 12 further comprising a housing cover slidably coupled to said central housing, said housing cover including first and second opposite ends, each said end including a downwardly extending lip that engages a flange on said bobbin cover to retain said bobbin cover to said central housing.

19. The sensor housing assembly of claim 12, wherein said bobbin core includes a latch button and said bobbin cover includes a latch receptacle that receives said latch button to attach said bobbin cover to said bobbin core with a snap fit.

20. The sensor housing assembly of claim 12, wherein said central housing includes first and second opposite ends, each said end including a slot extending horizontally across an interior surface thereof and vertically extending channels formed on an exterior surface thereof, said slots receiving ridges formed on a housing cover for sliding engagement therewith and said channels receiving mounting flanges on said bobbin core.

21. The sensor housing assembly of claim 1, wherein said bobbin assembly is the only power source for the sensor module.

22. The sensor housing assembly of claim 1, wherein said sensor housing assembly is batteryless.

23. The sensor housing assembly of claim 1, wherein said bobbin assembly generates power when rotated in a magnetic field.

24. The sensor housing assembly of claim 12, wherein said bobbin core extends along a linear axis.

* * * * *